3,734,935
BIOLOGICALLY ACTIVE 17α-ETHYNYL-16,17-DIHYDROXY-13-ALKYGONANES
George E. M. Husbands, Philadelphia, and Reinhardt P. Stein, Audubon, Pa., assignors to American Home Products Corporation, New York, N.Y.
No Drawing. Filed July 21, 1972, Ser. No. 274,004
Int. Cl. C07c 169/22
U.S. Cl. 260—397.4     1 Claim

ABSTRACT OF THE DISCLOSURE

13 - alkyl - 16α,17β - dihydroxy-gon-4-ene-3-one compounds are converted to 13-alkyl-16α,17β-dihydroxy-17-ethynyl gonane and 13-alkyl-16β,17β-dihydroxy gonane compounds having progestational and anti-estrogenic activity.

DESCRIPTION OF THE INVENTION

The invention sought to be patented resides in the concept of a compound of the structure

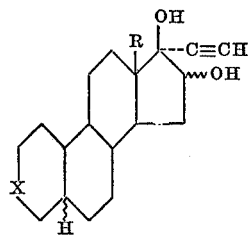

wherein R is alkyl of from 1 to 4 carbon atoms; and X is C=O,

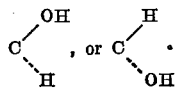

The tangible embodiments of the invention possess the inherent applied use characteristic of exerting progestational and anti-estrogenic effects upon administration to warm blooded animals.

The symbol ⋘ indicates that the configuration at the involved carbon atom is either α or β; in each case both epimeric forms are included in the invention.

DESCRIPTION OF THE PREFERRED EMBODIMENTS

Although, for convenience, the following discussion will describe the preparation of the compounds of the invention by reference to a particular embodiment thereof wherein R is ethyl, it is to be understood that this discussion is equally applicable to all of the embodiments of the invention.

Referring to the following flow chart wherein the compounds are assigned Roman numerals for purposes of identification, the starting material, 16α,17β-dihydroxy-13-ethylgon-4-en-3-one (XVI) may be prepared by means known in the art. Thus it may be prepared from the known compound, 13-ethyl-3-methoxygona-1,3,5(10)-triene-16α-17β-diol (British Pat. 1,115,954) by reduction with lithium metal and ammonia under Birch conditions followed by acid hydrolysis. Catalytic reduction of XVI, for example with hydrogen and 10% palladium on carbon affords the 5β-saturated A-ring compound (I); reduction of XVI with lithium metal in ammonia gives the corresponding 5α-compound (II). Further treatment of I and II to produce the corresponding 5α- and 5β-compounds of the invention is identical, so for convenience they are depicted together as Formula III. The subsequent discussion thus applies to both epimeric forms. After protection of III as the ketal (IV), for example by treatment with ethylene glycol, triethyl orthoformate and p-toluenesulfonic acid, the latter compound is selectively formylated with dimethyl formamide and methane sulfonyl chloride to afford the 16-formyl compound V. Oxidation of V, for example dimethyl-sulfoxide-acetic anhydride, or chromium trioxide in pyridine affords the corresponding 17-ketone (VI). Treatment of VI with ethynyl Grignard reagent,

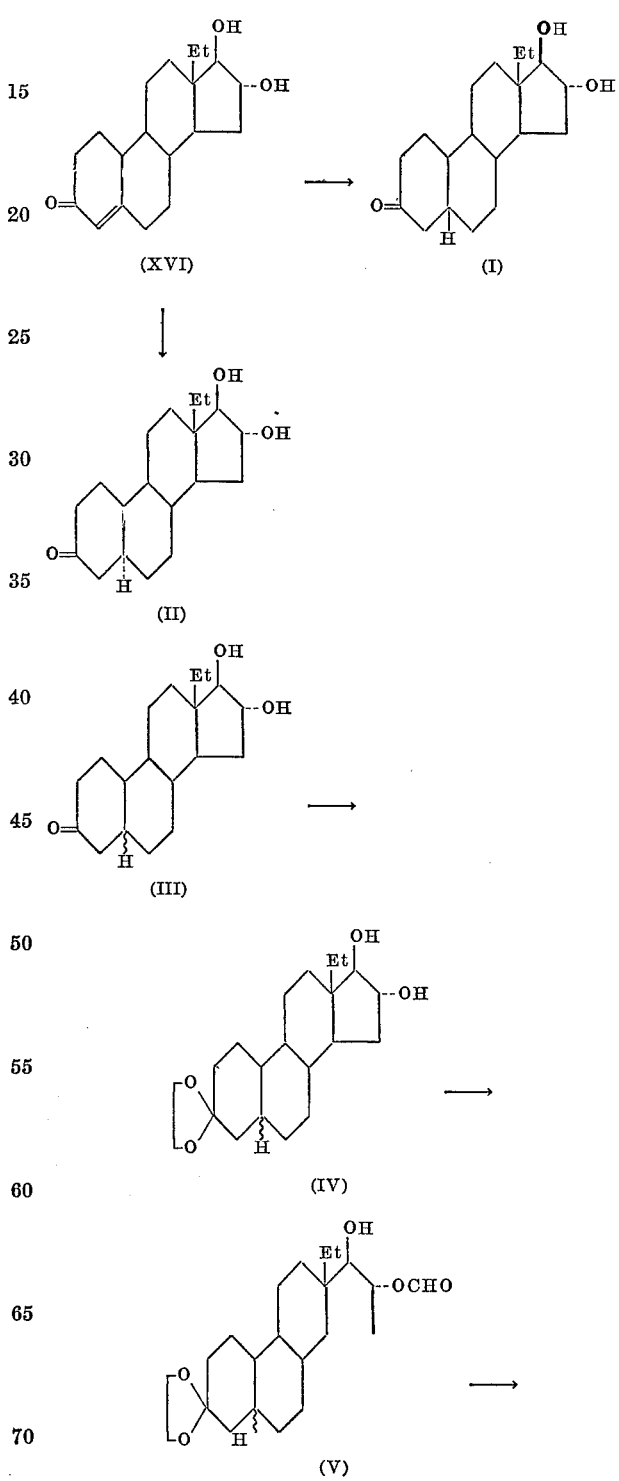

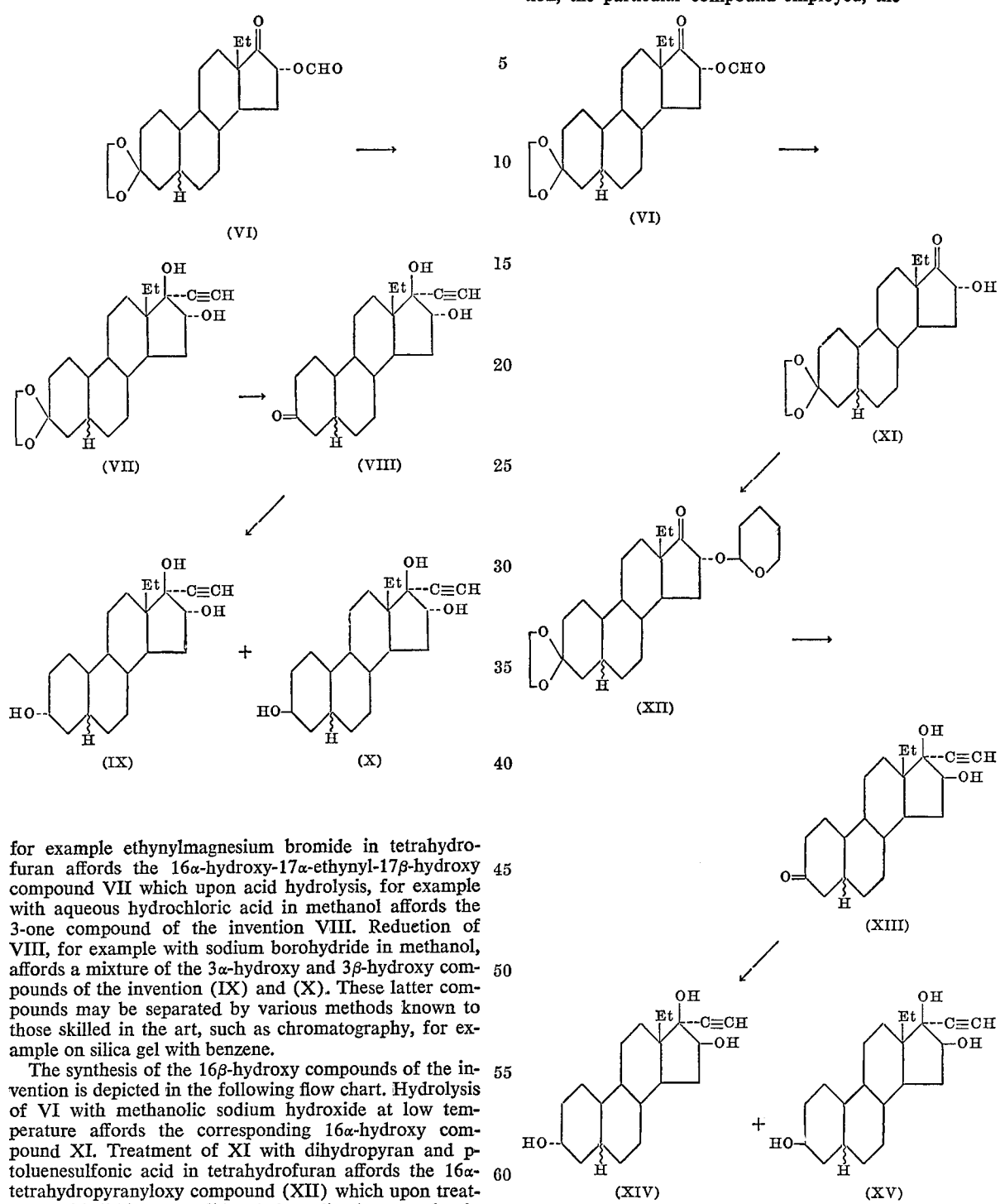

for example ethynylmagnesium bromide in tetrahydrofuran affords the 16α-hydroxy-17α-ethynyl-17β-hydroxy compound VII which upon acid hydrolysis, for example with aqueous hydrochloric acid in methanol affords the 3-one compound of the invention VIII. Reduction of VIII, for example with sodium borohydride in methanol, affords a mixture of the 3α-hydroxy and 3β-hydroxy compounds of the invention (IX) and (X). These latter compounds may be separated by various methods known to those skilled in the art, such as chromatography, for example on silica gel with benzene.

The synthesis of the 16β-hydroxy compounds of the invention is depicted in the following flow chart. Hydrolysis of VI with methanolic sodium hydroxide at low temperature affords the corresponding 16α-hydroxy compound XI. Treatment of XI with dihydropyran and p-toluenesulfonic acid in tetrahydrofuran affords the 16α-tetrahydropyranyloxy compound (XII) which upon treatment with lithium acetylide-ethylene diamine complex in dimethylsulfoxide/benzene, followed by acid hydrolysis of the protecting groups, for example with aqueous hydrochloric acid in methanol, affords the 16β,17β-dihydroxy-17α-ethynyl-gonan-3-one compound of the invention (XIII). Reduction of XIII, for example with sodium borohydride in methanol, affords a mixture of the 3α-hydroxy and 3β-hydroxy compounds of the invention (XIV) and (XV). These may be separated as described previously for IX and X.

In employing the compounds of the invention to produce a progestational and anti-estrogenic effect, the compounds may be administered by either the oral or parenteral routes. The amount of compound to be administered will vary depending on the route of administration, the particular compound employed, the particular animal involved, and the degree of response desired. Ideally, the dosage should be individualized in each case. Generally, a dose of 5 mg./kg. body weight will be sufficient to produce the desired progestational and anti-estrogenic effects.

The following examples further illustrate the best mode contemplated by the inventors of carrying out their invention:

EXAMPLE 1 dl-16α,17β-dihydroxy-13-ethyl-5β-gon-3-one

Add a solution of dl-16α,17β-dihydroxy-13-ethylgon-4-en-3-one (8.0 g.) in ethanol (200 ml.) to a prehydrogenated mixture of 10% palladium on charcoal (2.0 g.), potassium hydroxide (2.5 g.) and ethanol (100 ml.). Hydrogenate until one molar equivalent of gas is absorbed. Filter, concentrate the solution, and partition the concentrate between water and methylene chloride. Dry the methylene chloride solution with sodium sulfate and evaporate the extract in vacuo. Crystallize the compound from ethyl acetate-methanol to get 4.5 g. of pure title product, M.P. 210–212°.

EXAMPLE 2

*dl*-16α,17β-dihydroxy-13-ethyl-5α-gon-3-one

Add lithium metal (0.108 g.) to a mixture of liquid ammonia (66 ml.), dry toluene (20 ml.) and dry tetrahydrofuran (20 ml.) in a flask equipped with a magnetic stirrer and a Dry-Ice condenser. Slowly add a solution of *dl*-16α,17β-dihydroxy - 13 - ethylgon-4-en-3-one (1.06 g.) in dry toluene (20 ml.) and dry tetrahydrofuran (20 ml.). If the blue color of the lithium-liquid ammonia solution is prematurely discharged, add more lithium to restore it. Stir the reaction mixture for three minutes after addition of the starting compound. Add ethylene dibromide dropwise until the blue color disappears. Then add very cautiously a mixture of glacial acetic acid (2 ml.) and methanol (8 ml.). Evaporate the ammonia. Remove the solvents in vacuo. Partition the residual oil between water and ethyl acetate. Wash the ethyl acetate extract with water and brine, dry over sodium sulfate, concentrate the solution and crystallize the title compound from isopropanol-ethyl acetate to get 750 mg., M.P. 174–176°.

EXAMPLE 3

*dl*-3,3-ethylenedioxy-13-ethyl-5β-gona-16α,17β-diol

Add a mixture of ethylene glycol (2.0 ml.), triethyl orthoformate (5.0 ml.) and paratoluene sulfonic acid (50.0 mg.) to *dl*-16α,17β-dihydroxy-13-ethyl-5β-gon-3-one and reflux the mixture with stirring on an oil bath (125–135° C. external temperature) for one hour. Pour the mixture into sodium bicarbonate solution (200 ml.) and extract with ethyl acetate. Wash the extract with water and brine, dry over sodium sulfate and evaporate in vacuo to obtain the title compound as a light yellow oil.

For the substrate in the above experiment, substitute *dl*-16α,17β-dihydroxy - 13 - ethyl - 5α - gon-3-one to obtain also as a yellow oil, *dl*-3,3-ethylene-dioxy-13-ethyl-5α-gona-16α,17β-diol.

EXAMPLE 4

*dl*-3,3-ethylenedioxy-13-ethyl-5β-gona-16α,17β-diol, 16-formate

Cool spectroscopically pure dimethyl formamide (15 ml.) in an ice-methanol bath and add methanesulfonyl chloride (3 ml.) dropwise. Add this mixture to the sample of *dl*-3,3-ethylenedioxy - 13 - ethyl-5β-gona-16α,17β-diol obtained in Example 3 and stir for one hour at room temperature. Pour into a mixture of pyridine (6 ml.) and ice (large excess). Stir the mixture at room temperature for one hour. Extract with ethyl acetate, wash with water and brine and dry over sodium sulfate. Evaporate in vacuo to obtain the title product as an oil.

For the substrate in the above experiment, substitute *dl* - 3,3 - ethylenedioxy-13-ethyl-5α-gona-16α,17β-diol to obtain *dl* - 3,3 - ethylenedioxy-13-ethyl-5α-gona-16α,17β-diol, 16-formate as a crystalline solid, M.P. 189–192°.

EXAMPLE 5

*dl*-3,3-ethylenedioxy-16α-hydroxy-13-ethyl-5β-gon-17-one, formate

Dissolve *dl* - 3,3 - ethylenedioxy - 13 - ethyl-5β-gona-16α,17β-diol, 16-formate in dimethylsulfoxide (25 ml.) and acetic anhydride (6 ml.) and stir for 24 hours. Add saturated sodium bicarbonate and stir for a few minutes. Extract with ethyl acetate. Wash the extract with water and brine, dry over sodium sulfate and evaporate in vacuo to obtain the title product as an oil which crystallizes with difficulty, M.P. 125–128° C., from isopropanol-petroleum ether.

For the substrate in the above reaction, substitute *dl*-3,3 - ethylenedioxy - 13 - ethyl-5α-gona-16α,17β-diol, 16-formate to obtain *dl*-3,3-ethylenedioxy-16α-hydroxy-13-ethyl-5α-gon-17-one, formate.

EXAMPLE 6

*dl*-3,3-ethylenedioxy-16α-hydroxy-13-ethyl-5β-gon-17-one, formate

Add pyridine (150 ml.) to methylene chloride (1500 ml.) and stir well. Add chromium trioxide (20 g.) in small portions to the solvent mixture and stir for a further 15 minutes after addition. To that burgundy colored solution, add a solution of *dl*-3,3-ethylenedioxy-13-ethyl-5β-gona-16α,17β-diol, 16-formate (11 g.) in methylene chloride rapidly dropwise and stir for 90 minutes. Filter, wash the residue with ethyl acetate. Add water to the organic layer and extract with ethyl acetate to obtain a methylene chloride-ethyl acetate extract. Wash the extract with water and brine, dry over sodium sulfate and evaporate in vacuo. Dissolve the foam obtained in ethyl acetate, treat with activated charcoal, filter and dry the solution over sodium sulfate. Crystallize the product from ethyl acetate to obtain 9.2 g., M.P. 110–115° C.

For the substrate in the above experiment, substitute *dl*-3,3 - ethylene - dioxy - 13 -ethyl-5α-gona-16α,17β-diol, 16-formate to obtain *dl*-3,3-ethylenedioxy-16α-hydroxy-13-ethyl-5α-gon-17-one, formate as a crystalline product from ethyl acetate, M.P. 201–205° C.

EXAMPLE 7

*dl*-3,3-ethylenedioxy-13-ethyl-17α-ethynyl-5β-gona-16α,17β-diol

Equip a flask with a magnetic stirrer, condenser, and a gas inlet tube. Charge the flask with dry tetrahydrofuran (65 ml.) and 3 M ethereal methyl magnesium bromide (30 ml.). Bubble purified acetylene through the stirred solution for 2.5 hours, then add *dl*-3,3-ethylenedioxy-16α-hydroxy-13-ethyl-5β-gon-17-one, formate (1 g.). Reflux gently with stirring under acetylene for 3 hours then let stand at room temperature overnight. Pour the reaction into 20% ammonium chloride solution and extract with ethyl acetate. Wash, dry and evaporate the extract in vacuo. Crystallize the title product from ethyl acetate, M.P. 140–145° C.

For the substrate in the above experiment, substitute *dl* - 3,3 - ethylenedioxy-16α-hydroxy-13-ethyl-5α-gon-17-one, formate to obtain *dl*-3,3-ethylenedioxy-13-ethyl-17α-ethynyl-5α-gona-16α,17β-diol.

EXAMPLE 8

*dl*-16α,17β-dihydroxy-13-ethyl-17α-ethynyl-5β-gon-3-one

Add *dl* - 3,3 - ethylenedioxy-13-ethyl-17α-ethynyl-5β-gona-16α,17β-diol (325 mg.) to a mixture of methanol (6 ml.), hydrochloric acid (0.2 ml.) and water (0.5 ml.) and stir for 1½ hours. Add water and extract with ethyl acetate. Wash, dry and evaporate the extract in vacuo to obtain the title product as a white solid, yield 180 mg., M.P. 189–194° C.

For the substrate in the above recation substitute *dl*-3,3 - ethylenedioxy - 13 - ethyl - 17α-ethynyl-5α-gona-16α,17β - diol to obtain *dl* - 16α,17β-dihydroxy-13-ethyl-17α-ethynyl-5-α-gon-3-one.

EXAMPLE 9

*dl*-3,3-ethylenedioxy-16α-hydroxy-13-ethyl-5β-gon-17-one

Cool a solution of sodium hydroxide (0.2 g.) in methanol (15 ml.) to −5° to −10° C. Add *dl*-3,3-ethylenedioxy - 16α-hydroxy-13-ethyl-5β-gon-17-one, formate (500 mg.) and stir for one hour. Add 100 ml. of cold saturated ammonium chloride solution dropwise. Filter the precipitate and partition it between water and choloroform. Wash, dry and evaporate the chloroform layer to obtain the crystalline title compound, M.P. 190–194°.

For the substrate above, substitute dl-3,3-ethylenedioxy-16α-hydroxy-13-ethyl-5α-gon-17-one, formate to obtain dl-3,3-ethylenedioxy-16α-hydroxy-13-ethyl-5α-gon-17-one.

EXAMPLE 10 dl-3,3-ethylenedioxy-16α(tetrahydropyran-2-yloxy)-13-ethyl-5β-gon-17-one

Add dl-3,3-ethylenedioxy-16α-hydroxy-13-ethyl-5β-gon-17-one (960 mg.) to a mixture of dry tetrahydrofuran (5 ml.) purified dihydropyran (7 ml.) and paratoluene sulfonic acid (15 mg.). Warm the mixture to 40° and stir for one hour, adding a few crystals of paratoluene sulfonic acid. Add sodium bicarbonate solution (10 ml.). Evaporate the organic solvent in vacuo. Extract the residue with ethyl acetate, wash, dry, and evaporate the extract. Obtain the title compound as a crystalline product from ethyl acetate, M.P. 164–166° C.

For the above substrate, in Example 10, substitute dl-3,3-ethylenedioxy-16α-hydroxy-13-ethyl-5α-gon-17-one to obtain dl-3,3-ethylenedioxy-16α(tetrahydropyran-2-yloxy)-13-ethyl-5α-gon-17-one.

EXAMPLE 11 dl-3,3-ethylenedioxy-16β-(tetrahydropyran-2-yloxy)-13-ethyl-17α-ethynyl-5β-gon-17β-ol Equip a flask with a condenser, a magnetic stirrer and a gas inlet tube. Dissolve the dl-3,3-ethylenedioxy-16α-(tetrahydropyran-2-yloxy)-13-ethyl-5β-gon-17-one (400 mg.) in dry benzene (4.0 ml.), dilute the solution with dry dimethyl sulfoxide (10 ml.), pass purified acetylene gas into the solution and stir for one hour. Add lithium acetylide ethylenediamine complex (0.5 g.) and stir for 1.5 hours. Then add another 1.5 g. of complex and stir for 1 hour. Pour the mixture into ice water. Extract with ethyl acetate, wash, dry and evaporate the extract in vacuo to obtain the title product.

For the above substrate substitute dl-3,3-ethylenedioxy-16α(tetrahydropyran-2-yloxy)-13-ethyl-5α-gon-17-one to obtain dl-3,3-ethylenedioxy-16β(tetrahydropyran-2-yloxy)-13-ethyl-17α-ethynyl-5α-gon-17β-ol.

EXAMPLE 12 dl-16β,17β-dihydroxy-13-ethyl-17α-ethynyl-5β-gon-3-one

Add dl-3,3-ethylenedioxy-16β-(tetrahydropyran-2-yloxy)-13-ethyl-17α-ethynyl-5β-gon-17β-ol (300 mg.) to 10 ml. of a solution of concentrated hydrochloric acid (3.2 ml.) in methanol (100 ml.) and stir for two hours. Add water and extract with ethyl acetate. Wash, dry and evaporate the extract in vacuo to obtain the title compound.

For the above substrate substitute dl-3,3-ethylenedioxy-16β-(tetrahydropyran-2-yloxy)-13-ethyl-17α-ethynyl-5α-gon-17β-ol to obtain dl-16β,17β-dihydroxy-13-ethyl-17α-ethynyl-5α-gon-3-one.

EXAMPLE 13 dl-13-ethyl-17α-ethynyl-5β-gona-3α,16α,17β-triol and dl-13-ethyl-17α-ethynyl-5β-gona-3β,16α,17β-triol Add sodium borohydride (36 mg.) to a solution of dl-16α,17β-dihydroxy-13-ethyl-17α-ethynyl-5β-gon-3-one (90 mg.) in methanol (6 ml.). Stir for 30 minutes. Add water until precipitation is adjudged complete and extract with ethyl acetate. Wash, dry and evaporate the extract in vacuo to obtain the title products as a crystalline mixture.

For the substrate above, substitute dl-16α,17β-dihydroxy-13-ethyl-17α-ethynyl-5α-gon-3-one to obtain dl-13-ethyl-17α-ethynyl-5α-gona-3α,16α,17β-triol and dl-13-ethyl-17α-ethynyl-5α-gona-3β,16α,17β-triol.

For the above substrate, substitute dl-16β,17β-dihydroxy-13-ethyl-17α-ethynyl-5β-gon-3-one to obtain dl-13-ethyl-17α-ethynyl-5β-gona-3α,16β,17β-triol and dl-13-ethyl-17α-ethynyl-5β-gona-3β,16β,17β-triol.

For the above substrate, substitute dl-16β,17β-dihydroxy-13-ethyl-17α-ethynyl-5α-gon-3-one to obtain dl-13-ethyl-17α-ethynyl-5α-gona-3α,16β,17β-triol and dl-13-ethyl-17α-ethynyl-5α-gona-3β,16β,17β-triol.

EXAMPLE 14 dl-13-ethyl-17α-ethynyl-5β-gona-3α,16α,17β-triol

Dissolve dl-16β,17β-dihydroxy-13-ethyl-17α-ethynyl-5β-gon-3-one (80 mg.) in methanol (6 ml.) containing nitromethane (1.2 ml.). Add sodium borohydride and stir for 30 minutes. Add water and obtain a white precipitate. Extract with ethyl acetate, wash, dry and evaporate the extract in vacuo and obtain the title compound. Recrystallize from ethyl acetate-isopropanol, M.P. 173–174° C.

The subject matter which the applicants regard as their invention is particularly pointed out and distinctly claimed as follows:

1. A compound of the structure

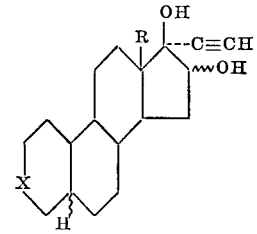

wherein R is alkyl of from 1 to 4 carbon atoms; and X is C=O,

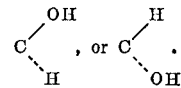

References Cited

UNITED STATES PATENTS

| | | | |
|---|---|---|---|
| 3,336,347 | 8/1967 | Engelfried et al. | 260—397.5 |
| 3,341,558 | 9/1967 | Farkas | 260—397.3 |

HENRY A. FRENCH, Primary Examiner

U.S. Cl. X.R.

260—239.55 C, 397.5, 999